US009389310B2

(12) United States Patent
Osterfeld et al.

(10) Patent No.: US 9,389,310 B2
(45) Date of Patent: Jul. 12, 2016

(54) METHOD FOR OPERATING A DISTANCE SENSOR AND DEVICE FOR CARRYING OUT THE METHOD

(75) Inventors: Martin Osterfeld, Schlaitdorf (DE); Sorin Fericean, Leonberg (DE)

(73) Assignee: Balluff GmbH, Neuhausen/Filder (DE)

( * ) Notice: Subject to any disclaimer, the term of this patent is extended or adjusted under 35 U.S.C. 154(b) by 372 days.

(21) Appl. No.: 14/117,163

(22) PCT Filed: May 13, 2011

(86) PCT No.: PCT/DE2011/001522
§ 371 (c)(1),
(2), (4) Date: Dec. 27, 2013

(87) PCT Pub. No.: WO2012/155870
PCT Pub. Date: Nov. 22, 2012

(65) Prior Publication Data
US 2014/0240168 A1     Aug. 28, 2014

(51) Int. Cl.
*G01S 13/02*     (2006.01)
*G01S 13/32*     (2006.01)
(Continued)

(52) U.S. Cl.
CPC . *G01S 13/32* (2013.01); *G01S 7/03* (2013.01); *G01S 7/4017* (2013.01); *G01S 7/4021* (2013.01);
(Continued)

(58) Field of Classification Search
CPC ..... G01S 7/038; G01S 7/4008; G01S 7/4021; G01S 13/34; G01S 13/887; G01S 13/931; G01S 7/03; G01S 7/032; G01S 7/4017; G01S 7/4056; G01S 13/32; G01S 2007/4065; G01S 7/4052; G01B 7/003

USPC ..................... 342/70, 145, 165, 190
See application file for complete search history.

(56) References Cited

U.S. PATENT DOCUMENTS

| | | | |
|---|---|---|---|
| 3,221,328 A | 11/1965 | Isch | |
| 6,953,926 B2 | 10/2005 | Reime | |
| 2010/0052972 A1* | 3/2010 | Kasano | ................. G01S 15/523 342/28 |

FOREIGN PATENT DOCUMENTS

| | | | |
|---|---|---|---|
| EP | 1 426 783 A1 | 6/2004 | |
| WO | 01/90770 A1 | 11/2001 | |

OTHER PUBLICATIONS
International Preliminary Report on Patentability of PCT/DE2011/001522, Nov. 19, 2013.
(Continued)

*Primary Examiner* — Timothy A Brainard
(74) *Attorney, Agent, or Firm* — Collard & Roe, P.C.

(57) ABSTRACT

A method for operation of a distance sensor emits a transmission signal as transmission radiation, reflected by an object, the distance of which is to be measured, as reflection radiation, and received as a reflection signal. The reflection signal and a reference signal that occur at a receiver input are regulated to a predetermined ratio. The distance is determined during the regulation process. An auxiliary transmission antenna emits an auxiliary transmission signal as auxiliary measurement radiation, directly toward a reception antenna. Microwaves are used as the transmission and auxiliary transmission signals. The reception antenna receives the reflection radiation reflected by the object and passes it on to the receiver input as a reflection signal. The reception antenna receives the auxiliary measurement radiation directly and passes it on to the receiver input as an auxiliary reception signal which is evaluated as a reference signal when measurement radiation emission is suppressed.

13 Claims, 3 Drawing Sheets

(51) Int. Cl.
*G01S 7/03* (2006.01)
*G01S 7/40* (2006.01)
*G01S 13/00* (2006.01)
*G01S 17/08* (2006.01)

(52) U.S. Cl.
CPC ............ *G01S 7/4052* (2013.01); *G01S 7/4056* (2013.01); *G01S 13/003* (2013.01); *G01S 17/08* (2013.01); *G01S 2007/4069* (2013.01)

(56) References Cited

OTHER PUBLICATIONS

F. Rottmann, E. Spiegel: Elektronikkonzept erfüllt Optiksensorträume, Elektronik, Fachzeitschrift Fuer Industrielle Anwender Und Entwickler, Oct. 2002, pp. 64-69.
International Search Report of PCT/DE2011/001522, mailed Mar. 23, 2012.

* cited by examiner

METHOD FOR OPERATING A DISTANCE SENSOR AND DEVICE FOR CARRYING OUT THE METHOD

CROSS REFERENCE TO RELATED APPLICATIONS

This application is the National Stage of PCT/DE2011/001522 filed on May 13, 2011, the disclosure of which is incorporated by reference. The international application under PCT article 21(2) was not published in English.

The invention proceeds from a method for operation of a distance sensor and from an apparatus for implementation of the method, in accordance with the preamble of the independent claims.

STATE OF THE ART

In the technical journal "Elektronik," [Electronics], technical journal for industrial users and developers, WEKA Fachmedien GmbH, Gruber Strasse 46a, D-85586 Poing, special printing Oct. 29, 2002, an optoelectronic distance sensor principle is described. The optical measurement radiation emitted by a transmission LED impacts an object, the distance of which from the distance sensor is to be measured, is reflected by the object, and received by a reception photodiode as reflected radiation. In addition to the measurement radiation path, a compensation radiation path is present, in which an optical radiation emitted by a compensation LED impacts the reception photodiode directly.

The optical radiation of the two radiation sources is modulated in rectangular manner, in each instance, whereby the modulation takes place with a counter-phase shift of 180°. This means that the two transmission LEDs are alternately cycled on and off. A demodulator switched as a synchronous rectifier determines the two signals received by the reception photodiode, and makes the difference between the two reception signals available to a regulator that determines a control variable with which the transmission power of the transmission LED and/or of the compensation ZED is regulated in such a manner that the two reception signals become equal in size. In the regulated state, the control variable becomes zero. The distance information is obtained by means of detection and evaluation of the transient regulation processes.

The arrangement is non-sensitive to a change in the sensitivity of the reception photodiode, which can vary as a function of the irradiation intensity, to a drift in the amplification factor of the amplifier, and to a change in the degree of efficiency of the transmission and compensation LED, as well as to a thermal drift of the arrangement, as a whole.

Furthermore, microwave radar sensors are known that allow a distance measurement or path measurement by means of microwaves. The microwaves reflected by an object are received and evaluated. Movements of the object are detected using CW Doppler radar. The distances can furthermore be detected using pulsed radar or an FMCW arrangement.

In order to be independent of amplitudes, FM (frequency modulation) is used in CW (continuous-wave) arrangements, whereby because of the running time, a frequency difference between the emitted microwave signal and the received microwave signal occurs, which is evaluated to determine the distance. Because of statutory provisions for the selection of the frequency range of the microwaves and, in particular, for the permissible bandwidth of the modulation signal, there are restrictions, particularly with regard to the modulation frequency, which is allowed to amount to maximally 250 MHz at a transmission frequency of 24 GHz, for example. As a result, the object separability, in other words the minimal detectable distance between two target objects ([in English:] targets) lies at 60 cm. If pulsed radar is used, the measurement range is also limited downward in view of the restriction of the flank steepness, because the reception pulse is only allowed to be received once the transmission pulse has ended. Because of the bandwidth restriction, the pulse durations or the flank steepness values for small distances below the meter range cannot be selected to be sufficiently small.

The invention is based on the task of indicating a method for operation of a distance sensor and apparatuses for implementation of the method, which are suitable for short distance, even below the meter range, with simple means, and allow great measurement accuracy independent of the measurement range.

The task is accomplished by means of the characteristics indicated in the independent claims, in each instance.

DISCLOSURE OF THE INVENTION

The invention relates to operation of a distance sensor, in which a transmission signal is emitted by a transmission antenna as measurement radiation, reflected by an object, the distance of which is to be measured, as reflection radiation, and received as a reflection signal, in which the reflection signal that occurs at a receiver input and a reference signal that also occurs at the receiver input are regulated to a predetermined ratio, whereby the distance is determined during the regulation process, in which an auxiliary transmission signal is emitted, as auxiliary measurement radiation, directly in the direction of a reception antenna, whereby microwaves are used as the transmission signal and as the auxiliary transmission signal, in which the reception antenna receives the reflection radiation reflected by the object and passes it on to the receiver input as a reflection signal, in which the reception antenna receives the auxiliary measurement radiation directly and passes it on to the receiver input as an auxiliary reception signal, and in which the received auxiliary reception signal is evaluated as a reference signal in the case of suppressed emission of the measurement radiation.

The method according to the invention for operation of the distance sensor is independent of any drift in power of a microwave transmitter used in the distance sensor, and of any drift in a required microwave receiver, because any drift that might occur acts on all the signals in the same manner. The significant advantage furthermore lies in the fact that an evaluation of an absolute reception field intensity or of a reception signal amplitude is eliminated by the compensation method that is provided.

With the method according to the invention, a CW (continuous-wave) microwave transmitter can be provided, so that a very slight distance can be measured. By means of the elimination of modulation of the transmission signal, regulations concerning signal bandwidths can be easily followed.

The method according to the invention allows short measurement cycles at simultaneously great dynamics. Because of the regulation to a specific ratio, which corresponds to a compensation method, any signal influences that do occur in the transmission branch and/or the reception branch, for example caused by temperature, are compensated and do not have any effect on the measurement result.

The method according to the invention is a purely energy-related method, which allows simple signal processing and signal evaluation. For this reason, complicated hardware and software are eliminated. Because of the simple implementation, low energy consumption can be achieved. Furthermore, the method according to the invention can be implemented cost-advantageously, for example within the scope of a compact, miniaturized structure.

Advantageous further developments and embodiments of the method according to the invention are the object of the dependent method claims.

The apparatuses according to the invention provide for either at least one transmission/reception antenna or at least one transmission antenna and at least one reception antenna separate from the transmission antenna. The apparatuses according to the invention for implementation of the method thereby allow flexible adaptation to different geometries.

Exemplary embodiments of the invention are shown in the drawing and explained in greater detail in the following description.

DETAILED DESCRIPTION OF THE EXEMPLARY EMBODIMENTS

Figure 1:
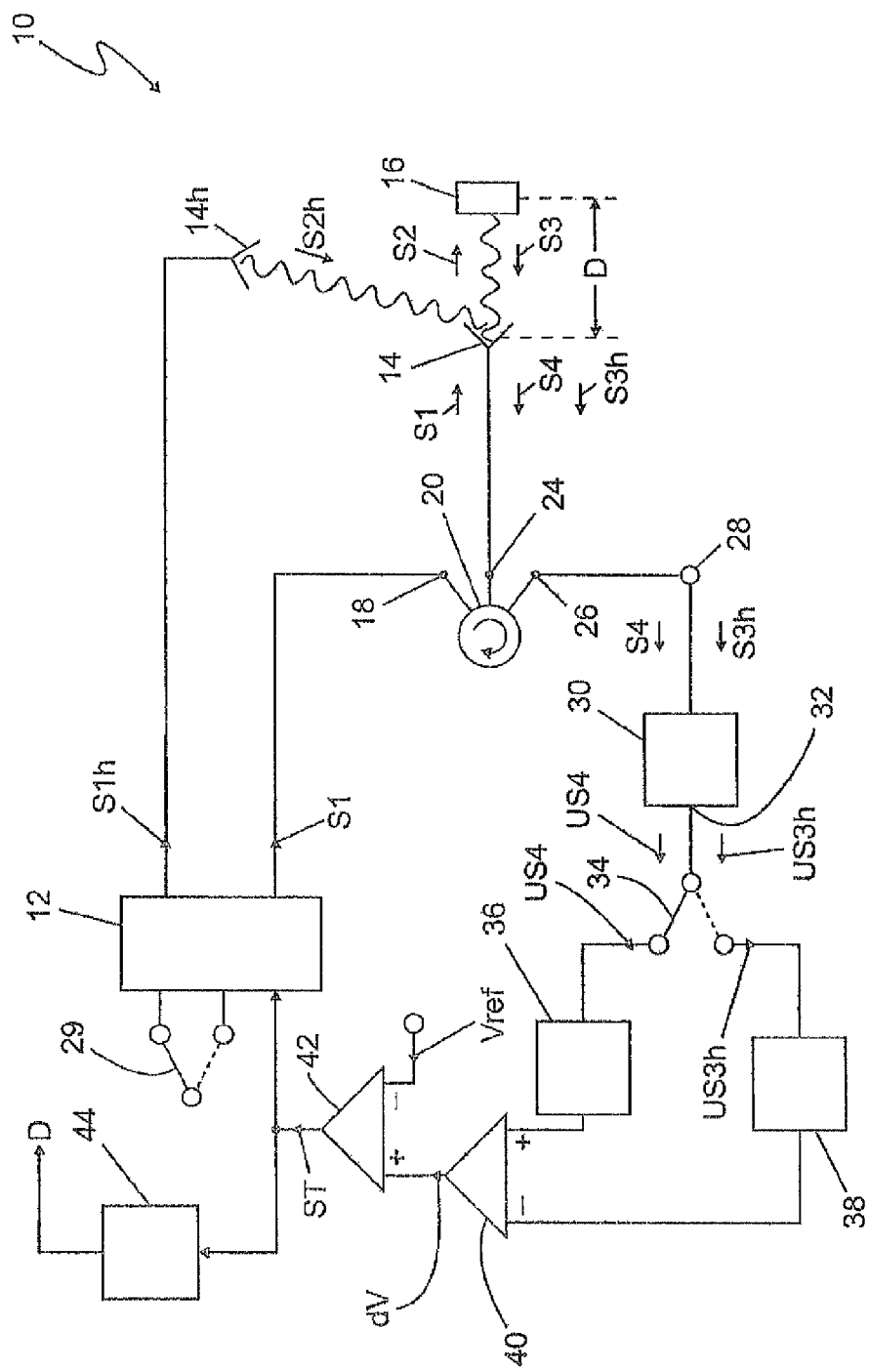
FIG. 1 shows a first exemplary embodiment of a distance sensor according to the invention, having a transmission/reception antenna and an auxiliary antenna.

FIG. 1 shows a distance sensor 10 in which a transmission signal S1 generated by a microwave oscillator 12 is emitted by a transmission/reception antenna 14 as measurement radiation S2, reflected by an object 16, the distance D of which from the distance sensor 10 is to be measured, and the reflection radiation S3 reflected by the object 16 is received by the transmission/reception antenna 14.

In the distance sensor 10 according to the invention, the signal attenuations D2, D3 of the measurement radiation S2 and of the reflection radiation S3 are evaluated on the segment between the transmission/reception antenna 14 and the object 16, in order to determine the distance D or the path of the object 16. According to FIG. 1, the distance D can be measured proceeding from the transmission/reception antenna 14.

The microwave oscillator 12 that makes the transmission signal S1 available is connected with a first connector 18 of a circulator 20, and the transmission/reception antenna 14 is connected with a second connector 24 of the circulator 20. The reflection signal S4, which corresponds to the reflection radiation S3, reaches a third connector 26 of the circulator 20 by way of the transmission/reception antenna 14, and by way of the second connector 24 of the circulator 20.

The circulator 20 is preferably implemented as a passive circulator 20. The circulator 20 separates signal directions. A signal that is fed in at an input is passed on to the next connector, in each instance. The signal is passed on unchanged at an open connector, and at a short-circuited connector the sign of the signal voltage is reversed. If the connector is closed with correct impedance, the signal is not passed on to the next connector. The signals are more or less passed on in a circle.

In the exemplary embodiment shown, the transmission signal S1 that occurs at the first connector 18 is passed on to the transmission/reception antenna 14, and is completely emitted as measurement radiation S2, with the proviso of impedance-correct adaptation of the transmission/reception antenna 14. The reflection radiation S3 reflected by the object 16 is passed on to the third connector of the circulator 20, as a reflection signal S4, by the transmission/reception antenna 14, by way of the second connector 24 of the circulator 20. The reflection signal S4 occurs at a reception input 28 of the distance sensor 10, which is connected with the third connector 26 of the circulator 20.

Furthermore, a further transmission signal, which will be referred to in the following as an auxiliary transmission signal S1$h$, is used to obtain a reference signal. For this purpose, the auxiliary transmission signal S1$h$ generated by the microwave oscillator 12 is emitted by an auxiliary transmission antenna 14$h$ as auxiliary measurement radiation S2$h$. The auxiliary transmission antenna 14$h$ emits the auxiliary measurement radiation S2$h$ directly in the direction of the transmission/reception antenna 14, which detects the auxiliary measurement radiation S2$h$ and passes it on to the receiver input 28 as an auxiliary transmission signal S3$h$. The auxiliary transmission signal S3$h$ is used as a reference signal.

Preferably, the auxiliary measurement radiation S2$h$ is suppressed during the first operational phase BP1. For this purpose, a change-over switch 29 can be provided, which causes the microwave transmitter 12 to make the transmission signal S1 available and suppresses the auxiliary transmission signal S1$h$, in the position shown.

Another embodiment, not shown in any detail, provides for a further circulator, at the first connector of which the microwave oscillator 12 is connected; a further change-over switch is connected at the second connector of the oscillator, and the first connector of the circulator 20 is connected at the third connector of the oscillator. The further change-over switch is open during the first operational phase BP1, so that the transmission signal S1 is passed on, unchanged, to the circulator 20, and is not emitted as auxiliary measurement radiation S2$h$.

In the second operational phase BP2, the auxiliary measurement radiation S2$h$ is emitted by the auxiliary transmission antenna 14$a$. The change-over switch 29 is switched over to the other position during the second operational phase BP2, whereby in this other position, the auxiliary transmission signal S1$h$ is made available.

The transmission signal S1 is suppressed during the second operational phase BP2 with the change-over switch 29. This also holds true for the embodiment having the additional circulator, which is not shown in any detail, because the auxiliary transmission signal S1$h$ is emitted by way of the auxiliary transmission antenna 14$a$ during the second operational phase BP2, and no transmission power can reach the transmission/reception antenna 14 any longer.

The reflection signal S4 during the first operational phase BP1 and the auxiliary reception signal S3$h$ during the second operational phase BP2 reach a receiver 30 that processes and demodulates the signals S4, S3$h$. At the receiver output 32, a first direct voltage US4 occurs during the first operational phase BP1, which is a measure of the reflection signal S4 when the auxiliary measurement radiation S2$h$ is suppressed, and a second direct voltage US3$h$ occurs during the second operational phase BP2, which is a measure of the reference signal, which only corresponds to the auxiliary reception signal S3$h$.

The receiver 30 contains a mixer, for example, for processing the reception signals S4, S3$h$, for conversion of the microwaves, the frequency of which lies at 24 GHz, for example, to a lower frequency range that is easier to handle in terms of signal technology. This conversion to an intermediate frequency range takes place in known manner, by means of mixing the microwaves at an oscillator frequency that deviates from the frequency of the transmission signal S1 or the auxiliary transmission signal S1h by the amount of the desired intermediate frequency.

The output 32 of the receiver 30 is connected with a first sample and hold circuit 36 during the first operational phase BP1 and with a second sample and hold circuit 38 during the second operational phase BP2. Accordingly, the first sample and hold circuit 36 stores the first direct voltage US4 that corresponds to the reflection signal S4, and the second sample and hold circuit 38 stores the direct voltage US3h that corresponds to the auxiliary reception signal S3h or the reference signal.

The two direct voltages US4, US3h reach a difference amplifier 40 that makes the difference voltage dV available as an output signal, which voltage is compared with a reference voltage Vref in a downstream comparator 42. The difference voltage dV depends on the attenuation D2h of the auxiliary measurement radiation S2h as well as on the attenuations D2, D3 of the transmission radiation S2 or of the reflection radiation S3, respectively, whereby the connection is contained in a logarithmic function.

The output signal of the comparator 42 can be referred to as a control variable ST, which is used to influence the power of the transmission signal S1 or of the auxiliary transmission signal S1h, respectively, whereby the power can be increased or lowered. The control variable ST can intervene, for example, in the amplification factor of an end stage of the microwave transmitter 12 and/or in a variable signal attenuation at the output of the microwave transmitter 12. During the regulation intervention, the method of procedure can be such that intervention in the power takes place in the first operational phase BP1 and/or in the second operational phase BP2. Particularly in the case of intervention in the second operational phase BP2, the transmission power can be increased, so that lower signal dynamics have to be managed in the receiver 30. For this reason, in the following, the point of departure is an influence on the auxiliary transmission signal S1h only, during the second operational phase BP2.

Purely fundamentally, however, the method of procedure can also be such that the transmission signal S1 is influenced during the determination of the distance D during the first operational phase BP1, while the level of the auxiliary transmission signal S1h is kept constant during the second operational phase BP2.

The goal of intervention with the control signal ST is to regulate the ratio between the reflection signal S4 and the auxiliary reception signal S3h in accordance with the reference signal, to a predetermined value. Setting can take place using the reference signal Vref, which can also be zero, for example, so that in the regulated state, the reflection signal S4 and the reference signal S3h can also be of equal size, in terms of amount.

In this way, the distance sensor 10 becomes independent of any drift in power of the microwave transmitter 12 and of any drift in the receiver 30, because any drift that might be present affects both signals S4, S3h. A significant advantage furthermore lies in that an evaluation of an absolute reception field intensity or of a reception signal amplitude, respectively, is eliminated with the compensation method provided. In this way, great accuracy can be achieved, overall.

The microwave transmitter 12 is operated at a constant frequency during CW operation. The minimal measurable distance D that can be achieved is not limited by pulse running times or restricted frequency modulation swings, and can reach down all the way to the distance D of zero, at least theoretically.

The information concerning the distance D of the object 16 from the transmission/reception antenna 14 lies in the difference voltage dV, which occurs transiently during the regulation process. The difference voltage dV is made available to a distance determination device 44 that determines the distance D from the difference voltage dV that occurs transiently. What can be evaluated is the maximal amplitude at the beginning of the regulation process and/or the reaction time or the signal flanks, respectively, when the distance D of the object 16 changes as the distance becomes less or greater. The relationship is preferably determined using a learning process, and stored in memory for subsequent operation of the distance sensor 10. The distance determination device 44 makes the distance D available at an output.

Figure 2:
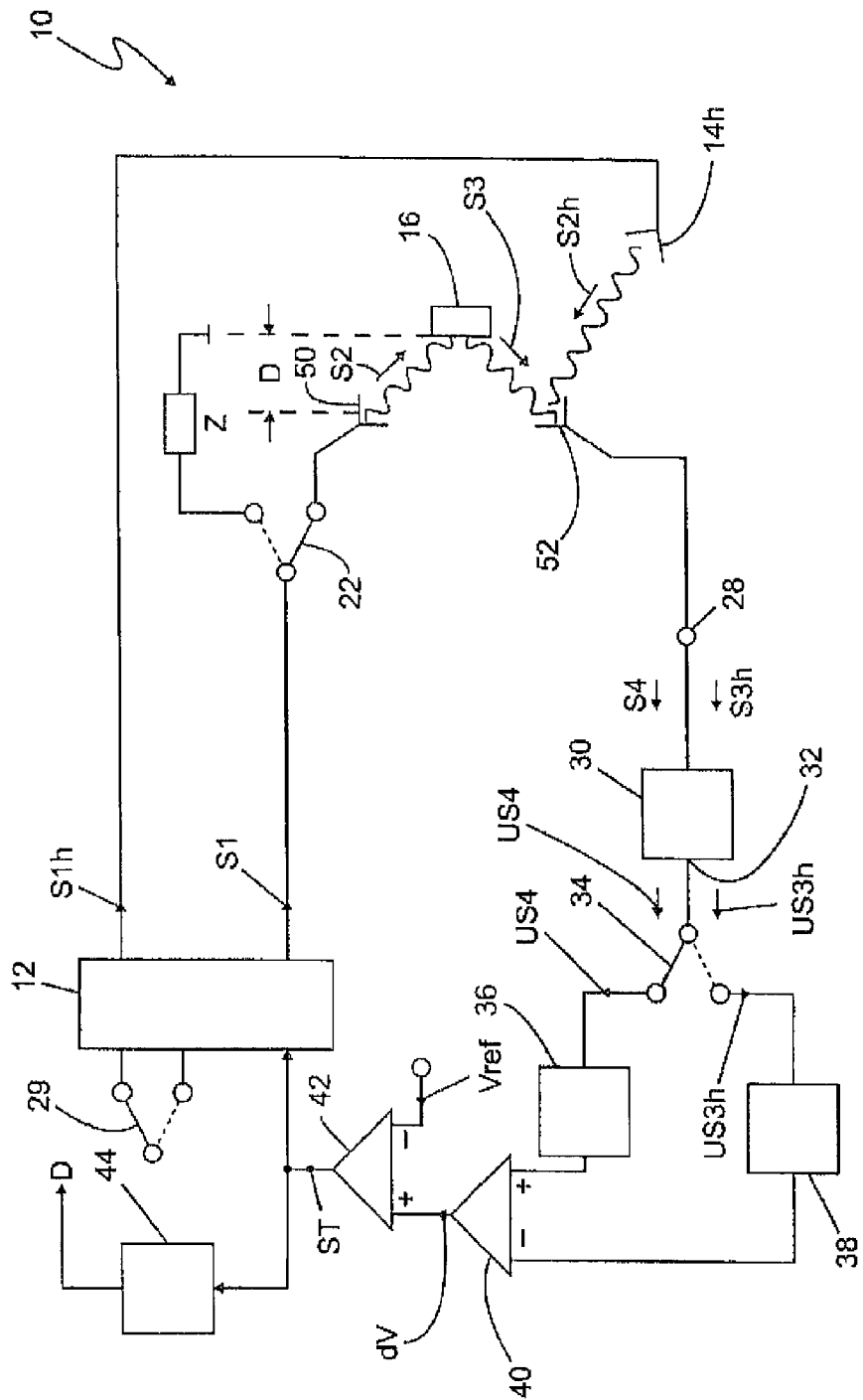
FIG. 2 shows a second exemplary embodiment of a distance sensor according to the invention, having a transmission antenna, a reception antenna provided separately from the transmission antenna as well as an auxiliary antenna.

FIG. 2 shows an alternative implementation possibility of the distance sensor 10 according to the invention. The parts shown in FIG. 2 that agree with those shown in FIG. 1 are indicated with the same reference symbols, in each instance.

A transmission antenna 50 and a reception antenna 52, provided separately from the transmission antenna 50, are present. In this exemplary embodiment, as well, the measurement radiation S2 emitted by the transmission antenna 50 impacts the object 16, the distance D of which, from the distance sensor 10 is to be measured. The reflection radiation S3 reflected by the object 16 is received by the reception antenna 52 and occurs at the receiver input 28 as a reflection signal S4.

In this exemplary embodiment, as well, the auxiliary transmission signal S1h is emitted by the auxiliary transmission antenna 14a as auxiliary measurement radiation S2h, and received by the reception antenna 52, so that the auxiliary measurement radiation S2h is once again detected as an auxiliary reception signal S3h and can be evaluated as a reference signal.

In this exemplary embodiment, as well, the second changeover switch 29 can be provided, with which the microwave transmitter 12 can be caused to make the transmission signal S1 available during the first operational phase BP1 and to make the auxiliary transmission signal S1h available during the second operational phase BP2. Furthermore, here, too, the embodiment not shown in any detail, with the further, in this case the only circulator, can be provided, whereby then, the first change-over switch 22 can also be eliminated again.

The signal processing starting from the receiver input 28 does not differ from the exemplary embodiment shown in FIG. 1, having at least one transmission/reception antenna 14.

FIGS. 3a to 3h show the signal progressions as a function of time t.

Figure 3A:
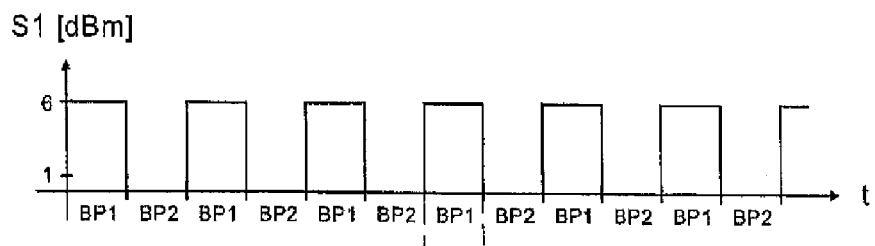
FIGS. 3a to 3h show signal progressions as a function of time t, which occur in a distance sensor according to the invention.

FIG. 3a shows a possible transmission level in dBm of the transmission signal S1 during the first operational phase BP1, which occurs in the first exemplary embodiment of the distance sensor 10 according to the invention.

Figure 3B:
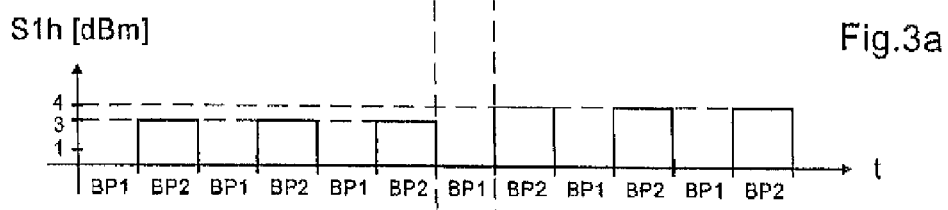

FIG. 3b shows a possible transmission level in dBm of the auxiliary transmission signal S1h during the second operational phase BP2, which occurs in the first exemplary embodiment of the distance sensor 10 according to the invention.

The exemplary embodiment shown proceeds from the assumption that because of the lower attenuation D2h of the auxiliary measurement radiation S2h that is assumed, the level of the auxiliary transmission signal S1h, at 3 dBm, for example, can be lower than the level of 6 dBm of the transmission signal S1 of the measurement radiation S2. The lower attenuation D2h of the auxiliary measurement radiation S2h is due to the fact that the auxiliary transmission antenna 14h is generally positioned closer to the transmission/reception antenna 14 or to the reception antenna 52, respectively, than the object 16.

Furthermore, here it is once again assumed that within the scope of determining the distance D, the level of the auxiliary transmission signal S1h is regulated during the second operational phase BP2, while the level of the transmission signal S1 is kept constant during the first operational phase BP1.

The level of the auxiliary transmission signal S1h increases to 4 dBm starting from the time point T. At the time point T, an approach to the object 16 is assumed, so that after this time point, a lesser distance D is measured than before the time point T, whereby the level of the direct voltage US4 increases. To regulate out the difference voltage dV, the level of the direct voltage US3h and therefore the level of the auxiliary transmission signal S1h must therefore also be increased.

Figure 3C:

FIG. 3c shows the signal attenuation D2h of the auxiliary measurement voltage S2h and the sum of the signal attenuations D2+D3, to which the transmission radiation S2 and the reflection radiation S3 are subjected, whereby the signal attenuation D2h of the auxiliary measurement radiation S2h—as has already been mentioned—is supposed to lie lower, at 2 dB, for example, than the sum of the signal attenuations D2+D3 of the radiation signals S2, S3, which are at first assumed to be 4 dB and then 3 dB, starting from the time point T.

Figure 3D:
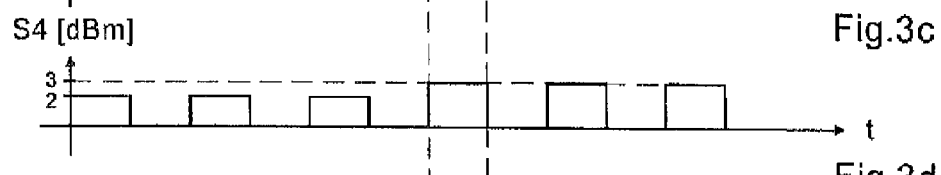

FIG. 3d shows the level, in dBm, of the reflection signal S4, which lies at 2 dBm, whereby the level of 2 dBm results from the level of 6 dBm of the transmission signal S1 minus the sum of the signal attenuations D2+D3 of the radiation signals S2, S3 of 4 dB. Starting from the time point T, the level of the reflection signal S4 increases to 3 dBm, due to the approach of the object 16.

Figure 3E:
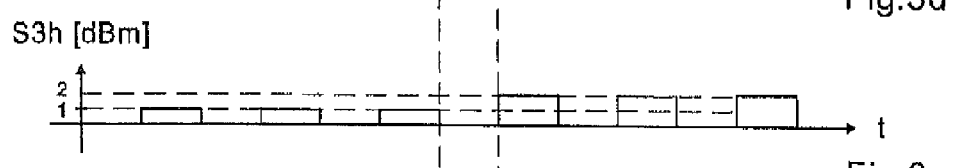

FIG. 3e shows the level, in dBm, of the auxiliary reception signal S3h, which lies at 1 dBm, whereby the level of 1 dBm results from the level of 3 dBm of the auxiliary transmission signal S1 minus the signal attenuation D2h of the auxiliary measurement radiation of 2 dB. Starting from the time point T, the level of the auxiliary reception signal S3h increases accordingly to 2 dBm, because of the increase in the level of the auxiliary transmission signal S1h by 1 dBm.

Figure 3F:

FIG. 3f shows the direct voltage US4 that corresponds to the reflection signal S4, which increases to a higher level at the time point T, due to the approach of the object 16 and of the lower attenuations D2+D3 of the radiation signals S2, S3 that result from this.

Figure 3G:

FIG. 3g shows the direct voltage US3h that corresponds to the auxiliary reception signal S3h, which increases after the time point T, because of the regulation of the difference voltage dV.

Figure 3H:
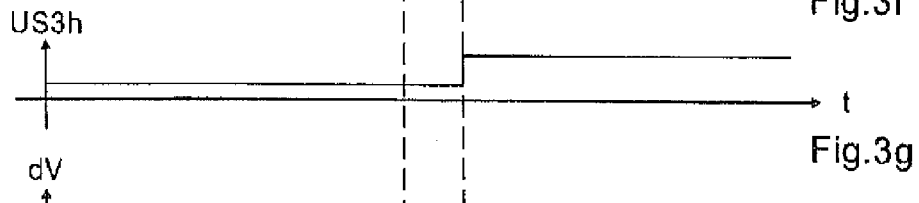

FIG. 3h shows the regulation process of the difference voltage dV, which begins at the time point T and should already have been concluded during the subsequent second operational phase BP2, according to the exemplary embodiment.

As has already been described, the maximal amplitude during the regulation process and/or the reaction time or the signal flanks, respectively, can be used to determine the distance D of the object 16.

In the following, a numerical example is given, which is used to illustrate the relationships.

A transmission power Pout of 6 dBm is assumed. The air attenuation DL, which is composed of the attenuations D2, D3 of the transmission radiation S2 and of the reflection radiation S3 on the path from the transmission/reception antenna 14 or the transmission antenna 50 to the object 16, respectively and from the object 16 back to the transmission/reception antenna 14 or the reception antenna 52, respectively, can be described by:

$$DL = 10\log(Pout/Pin) = 10\log(1/D^3)$$

whereby Pin is the power at the receiver input 28. At a distance D=2 m, the air attenuation DL=−6 dB.

At an assumed attenuation D2h of the auxiliary measurement radiation S2h of −2 dB, the power Pref of the reference signal S3h is:

$$Pref = Pout - D4h = 6\, dBm - 2\, dB = 4\, dBm.$$

The power Pin results as:

$$Pin = Pout - DL = 6\, dBm - 6\, dB = 0\, dBm.$$

In the event of a change in the distance D of the object 16, a difference voltage dV occurs:

$$dV = Uin - Uref$$

$$dV = 10\,SQRT(Pin) - 10\,SQRT(Pref)$$

$$dV = 10[SQRT(Pin) - SQRT(Pref)]$$

$$\log dV = \log 10 + \log[SQRT(Pin/Pref)]$$

$$\log dV = \log 10 + \log[SQRT(10\exp\{(Pin/Pref)/10\})]$$

$$\log dV = \log 10 + \log[SQRT(10\exp\{(Pout - DL - Pout + D2h)/10\})]$$

$$\log dV = \log 10 + \log[SQRT(10\exp\{(D2h - DL)/10\})]$$

This means that when the attenuation of the auxiliary measurement radiation S2h is known, the difference voltage dV is only a function of the air attenuation DL, and therefore of the distance D of the object 16.

The invention claimed is:

1. A method for operation of a distance sensor comprising:
   emitting a transmission signal by a transmission antenna as measurement radiation;
   reflecting the measurement radiation by an object as reflection radiation;
   receiving the reflection radiation as a reflection signal via a reception antenna;
   regulating in a regulating process the reflection signal that occurs at a receiver input and a reference signal that also occurs at the receiver input to a predetermined ratio, wherein a distance from the object to the transmission antenna is determined during the regulation process;
   emitting an auxiliary transmission signal by an auxiliary transmission antenna, as auxiliary measurement radiation, directly toward the reception antenna, wherein microwaves are used as the transmission signal and as the auxiliary transmission signal;
   receiving via the reception antenna the reflection radiation reflected by the object and passes the reflection radiation on to the receiver input as the reflection signal;
   receiving via the reception antenna the auxiliary measurement radiation directly and passes the auxiliary measurement radiation on to the receiver input as an auxiliary reception signal;
   making the transmission signal and the auxiliary transmission signal available by a microwave oscillator as continuous wave signals, at a constant frequency and without modulation;
   converting the reflection signal and the auxiliary reception signal in a mixer to a lower frequency range as compared with the microwave range; and evaluating the auxiliary reception signal as received as the reference signal when emission of the measurement radiation is suppressed.

2. The method according to claim 1,
wherein the transmission signal is emitted as measurement radiation and the reflection radiation reflected by the object is received as the reflection signal during a first operational phase;
wherein the auxiliary transmission signal is emitted as an auxiliary measurement radiation and the emission of the measurement radiation is suppressed during a second operational phase; and
wherein the auxiliary reception signal received during the second operational phase is evaluated as the reference signal.

3. The method according to claim 2, wherein the reflection signal that occurs at the receiver input during the first operational phase and the reference signal that occurs during the second operational phase are stored, and the stored signals are put into relation with one another.

4. The method according to claim 3, wherein the relation is produced by forming a signal difference and comparing the signal difference with an adjustable reference signal for regulation.

5. The method according to claim 4, wherein the amount of the adjustable reference signal is established at zero.

6. The method according to claim 4, wherein the transmission signal has a transmission signal power and the auxiliary transmission signal has an auxiliary signal power and wherein the distance of the object is determined from the signal difference during regulation of at least one of the transmission signal power and the auxiliary transmission signal power.

7. The method according to claim 2, wherein the transmission signal has a transmission signal power and the auxiliary transmission signal has an auxiliary transmission signal power and wherein at least one of the transmission signal power made available during the first operational phase, the transmission power made available during the second operational phase, and the auxiliary transmission signal power is subsequently regulated.

8. The method according to claim 1, wherein the transmission signal has a transmission signal power and the auxiliary transmission signal has an auxiliary transmission signal power and wherein at least one of the transmission signal power and the auxiliary transmission signal power is regulated.

9. The method according to claim 1, wherein the continuous wave microwave signal is used as the transmission signal and the auxiliary transmission signal.

10. An apparatus for implementation of the method according to claim 1, comprising the reception antenna and the auxiliary transmission antenna.

11. The apparatus according to claim 10, wherein sample and hold circuits for storing the reflection signal and the auxiliary reception signal evaluated as the reference signal, corresponding to the auxiliary measurement radiation, are provided.

12. An apparatus for implementation of the method according to claim 1, comprising at least one transmission antenna and the auxiliary transmission antenna as well as the reception antenna, wherein the reception antenna is separate from the transmission antenna and the auxiliary transmission antenna.

13. The apparatus according to claim 12, wherein sample and hold circuits for storing the reflection signal and the auxiliary reception signal evaluated as the reference signal, corresponding to the auxiliary measurement radiation, are provided.

* * * * *